(12) United States Patent
Biesterveld et al.

(10) Patent No.: US 10,409,305 B2
(45) Date of Patent: Sep. 10, 2019

(54) HVAC SYSTEM CONFIGURATION AND ZONE MANAGEMENT

(71) Applicant: Trane International Inc., Davidson, NC (US)

(72) Inventors: Matthew Biesterveld, Holmen, WI (US); Nagappan Chidambaram, West Salem, WI (US); Manoj Kumar Puli, Chennai (IN); Scott J. Delo, Braddock, PA (US)

(73) Assignee: Trane International Inc., Davidson, NC (US)

( * ) Notice: Subject to any disclaimer, the term of this patent is extended or adjusted under 35 U.S.C. 154(b) by 47 days.

(21) Appl. No.: 15/487,207

(22) Filed: Apr. 13, 2017

(65) Prior Publication Data

US 2018/0217621 A1 Aug. 2, 2018

Related U.S. Application Data

(60) Provisional application No. 62/451,742, filed on Jan. 29, 2017.

(51) Int. Cl.
*G05D 23/19* (2006.01)
*F24F 11/30* (2018.01)
*F24F 11/62* (2018.01)
*F24F 11/63* (2018.01)

(52) U.S. Cl.
CPC ..... *G05D 23/1934* (2013.01); *G05D 23/1917* (2013.01); *F24F 11/30* (2018.01); *F24F 11/62* (2018.01); *F24F 11/63* (2018.01)

(58) Field of Classification Search
CPC .............................. G05D 23/1934; F24F 11/62
See application file for complete search history.

(56) References Cited

U.S. PATENT DOCUMENTS

| 5,559,955 A | 9/1996 | Dev et al. |
| 7,069,161 B2 | 6/2006 | Gristina et al. |
| 7,103,511 B2 | 9/2006 | Petite |

(Continued)

OTHER PUBLICATIONS

Steven T. Taylor, P.E. and Jeff Stein, P.E., Sizing VAV Boxes, ASHRAE Journal, pp. 30-35, Mar. 2004.

*Primary Examiner* — Vincent H Tran
(74) *Attorney, Agent, or Firm* — The Salerno Law Firm, P.C.

(57) ABSTRACT

Systems and methods for HVAC system design and zone group management are disclosed. A floor plan of a building is received, and an HVAC system configuration is selected from among a set of template HVAC configurations. HVAC components are selected from set of template HVAC components to customize the configuration. As components are selected, candidate positions for the HVAC component within the HVAC system configuration are determined and presented to a user to ensure compliance with engineering requirements. The floor plan includes a mapping of an HVAC system configuration to an HVAC zone group. If a change is made to the HVAC system configuration of a zone associated with a zone group, it is determined if another zone group shares the same properties as the changed HVAC configuration. If one exists, the changes]d zone is moved to the new zone group. If not, a new zone group is created and the changes zone is moved to the new zone group.

17 Claims, 18 Drawing Sheets

(56) References Cited

U.S. PATENT DOCUMENTS

| | | |
|---|---|---|
| 7,512,450 B2 | 3/2009 | Ahmed |
| 7,668,671 B1 | 2/2010 | Gristina |
| 7,689,386 B1 * | 3/2010 | Gates .................. G06F 17/50 |
| | | 700/145 |
| 7,702,421 B2 | 4/2010 | Sullivan et al. |
| 7,904,186 B2 | 3/2011 | Mairs et al. |
| 7,925,384 B2 | 4/2011 | Huizenga et al. |
| 7,963,454 B2 | 6/2011 | Sullivan et al. |
| 8,024,054 B2 | 9/2011 | Mairs et al. |
| 8,078,330 B2 | 12/2011 | Brickfield et al. |
| 8,099,178 B2 | 1/2012 | Mairs et al. |
| 8,155,664 B2 | 4/2012 | McFarland |
| 8,196,185 B2 | 6/2012 | Geadelmann et al. |
| 8,239,922 B2 | 8/2012 | Sullivan et al. |
| 8,266,076 B2 | 9/2012 | Lopez et al. |
| 8,331,790 B2 | 12/2012 | Pederson et al. |
| 8,412,643 B2 | 4/2013 | Lopez et al. |
| 8,473,852 B2 | 6/2013 | Russell |
| 8,600,556 B2 | 12/2013 | Nesler et al. |
| 8,880,231 B2 | 11/2014 | Boucher et al. |
| 9,134,715 B2 | 9/2015 | Geadelmann et al. |
| 9,152,153 B2 | 10/2015 | Sullivan et al. |
| 9,244,444 B2 | 1/2016 | Carty et al. |
| 9,363,018 B2 | 6/2016 | Pederson et al. |
| 9,461,740 B2 | 10/2016 | Pederson |
| 9,519,731 B2 | 12/2016 | Strelec et al. |
| 2002/0151992 A1 | 10/2002 | Hoffberg et al. |
| 2003/0135339 A1 | 7/2003 | Gristina et al. |
| 2005/0234600 A1 | 10/2005 | Boucher et al. |
| 2005/0275525 A1 | 12/2005 | Ahmed |
| 2007/0053513 A1 | 3/2007 | Hoffberg |
| 2007/0055757 A1 | 3/2007 | Mairs et al. |
| 2007/0061046 A1 | 3/2007 | Mairs et al. |
| 2007/0067062 A1 | 3/2007 | Mairs et al. |
| 2007/0219767 A1 * | 9/2007 | Carter .................. C07K 14/765 |
| | | 703/11 |
| 2007/0255536 A1 * | 11/2007 | Simmons ........... B60H 1/00642 |
| | | 703/1 |
| 2008/0317475 A1 | 12/2008 | Pederson et al. |
| 2009/0057424 A1 | 3/2009 | Sullivan et al. |
| 2009/0076779 A1 * | 3/2009 | Simmons ........... B60H 1/00642 |
| | | 703/1 |
| 2011/0264419 A1 | 10/2011 | Wegman, III |
| 2012/0006282 A1 | 1/2012 | Kates |
| 2012/0183301 A1 | 7/2012 | Pederson |
| 2012/0189316 A1 | 7/2012 | Pederson |
| 2012/0306621 A1 * | 12/2012 | Muthu ................ H05B 37/0272 |
| | | 340/8.1 |
| 2013/0094863 A1 | 4/2013 | Pederson et al. |
| 2013/0138249 A1 * | 5/2013 | Cho ...................... G05B 19/02 |
| | | 700/276 |
| 2013/0168961 A1 | 7/2013 | Stahlkopf et al. |
| 2014/0018940 A1 * | 1/2014 | Casilli .................... G05B 15/02 |
| | | 700/29 |
| 2014/0039844 A1 * | 2/2014 | Strelec ................ G06F 17/5004 |
| | | 703/1 |
| 2014/0058572 A1 | 2/2014 | Stein et al. |
| 2014/0143695 A1 | 5/2014 | Sundermeyer et al. |
| 2014/0270797 A1 | 9/2014 | Pederson |
| 2014/0277765 A1 | 9/2014 | Karimi et al. |
| 2014/0330611 A1 | 11/2014 | Steven et al. |
| 2015/0186558 A1 * | 7/2015 | Khanzode ........... G06F 17/5004 |
| | | 703/1 |
| 2015/0287247 A1 * | 10/2015 | Willis ..................... G06T 19/20 |
| | | 345/419 |
| 2015/0350443 A1 * | 12/2015 | Kumar ................ H04M 3/5232 |
| | | 379/265.13 |
| 2016/0004798 A1 | 1/2016 | Crawford et al. |
| 2016/0277110 A1 | 9/2016 | Pederson et al. |
| 2017/0026118 A1 | 1/2017 | Pederson |
| 2017/0052536 A1 | 2/2017 | Warner et al. |

* cited by examiner

HVAC SYSTEM CONFIGURATION AND ZONE MANAGEMENT

CROSS-REFERENCE TO RELATED APPLICATION

This application claims the benefit of and priority to U.S. Provisional Application Ser. No. 62/451,742 entitled "HVAC SYSTEM CONFIGURATION AND ZONE MANAGEMENT" and filed Jan. 29, 2017, the entirety of which is hereby incorporated by reference herein for all purposes.

BACKGROUND

1. Technical Field

The present disclosure is directed to modeling and designing complex HVAC systems, and in particular, to systems and methods for simulating HVAC component sizing, energy consumption, and economic factors to optimize HVAC component selections and interconnections used to configure an HVAC system.

2. Background of Related Art

HVAC system installations can range from residential systems which typically have an outdoor unit and an indoor unit connected by a single refrigerant circuit, and controlled by a single thermostat, to commercial systems which may include multiple variable air volume (VAV) boxes, chiller plants, rooftop units, variable refrigerant flow (VRF) systems, and convectors under the control of a highly customized building automation system (BAS). Considerable resources and technical expertise are required to design and build an HVAC system, particularly in the case of commercial buildings having many rooms which may have different climate control requirements. Modern HVAC systems are expected to be efficient, flexible, and meet rigid energy usage requirements. HVAC system requirements may differ based on the local climate and zoning regulations. As a result, computer-implemented HVAC design and modeling methods have been employed to assist the HVAC design engineer in planning, designing, specifying, and installing an HVAC system. Such systems may have drawbacks because as the number of HVAC components used in the system increases, the design decisions faced by the design engineer while keeping track of the many technical requirements of each component quickly becomes unmanageable, leading to a non-optimal design. An HVAC design and modeling tool that provides useful, improved features in an efficient and easy-to-use manner would be a welcome advance.

SUMMARY

In one aspect the present invention is directed to a method for constructing an HVAC system for a structure, such as a building, having distinct thermal zones. The method defining the structure and defining an HVAC topology included in the structure. Common elements of the HVAC topology associated with a distinct thermal zone are identified, and a zone group comprising distinct zones sharing similar common elements and thermal properties is defined. The zone group is modified if at least one distinct zone of the zone group no longer shares common elements with at least one other distinct zone of the zone group. A set of HVAC parameters for the structure is generated.

In some embodiments, defining the HVAC topology included in the structure includes defining one or more HVAC components included in the structure. In some embodiments, defining an HVAC topology included in the structure includes defining an interconnection between one or more HVAC components included in the structure. In some embodiments, the modifying the zone group includes removing from the zone group the distinct zone that no longer shares common elements with at least one other distinct zone of the zone group, and adding the removed distinct zone to a different zone group comprising distinct zones sharing similar common elements with the removed distinct zone. In some embodiments, defining an HVAC topology included in the structure includes providing a set of pre-defined characteristics of an HVAC component, wherein the pre-defined characteristics include a configuration rule and a simulation rule. A representation of a distinct thermal zone is inserted into a zone tree. The HVAC component is joined to at least one other HVAC component in the distinct thermal zone, if any, based upon the pre-defined characteristics of the respective HVAC components. In some embodiments, the set of pre-defined characteristics of an HVAC component are expressed in an extensible markup language. In some embodiments, inserting the representation into a zone tree representative of a distinct thermal zone includes storing the configuration rule and the simulation rule in third normal form.

In another aspect, a method for constructing an HVAC system model of a structure having distinct thermal zones is disclosed. The method includes defining the structure, defining a plurality of HVAC components included in the structure, defining interconnections between two or more of the plurality of HVAC components included in the structure, identifying a further HVAC component to be inserted into an interconnection of the structure, and identifying a candidate interconnection into which the further HVAC component may be inserted.

In yet another aspect, method for manipulating HVAC system configurations is disclosed. The method includes displaying a plurality of HVAC system configurations in a viewer executing on an electronic device having a graphic display, receiving, at the electronic device, a user selection of HVAC system configuration displaying the selected HVAC system configuration in the viewer displaying a plurality of HVAC components in the viewer; receiving, at the electronic device, a user selection of a HVAC component applying a rules-based engine to determine the possible locations within the HVAC system configuration where the selected HVAC component may be placed; and displaying the possible locations the selected HVAC component may be placed on the HVAC system configuration in the viewer.

In still another aspect, the present disclosure is directed to a computer-implemented method for configuring a heating, ventilation, and air conditioning (HVAC) system of a building. The method includes receiving, by a processor, a floor plan of the building; receiving, by the processor, an HVAC system configuration selected from among a set of template HVAC configurations; receiving, by the processor, an HVAC component selected from among a set of template HVAC components; determining, by the processor, a candidate position for the HVAC component within the HVAC system configuration; and displaying, on a visual display in communication with the processor; the candidate position for the HVAC component on a schematic diagram of the HVAC system configuration.

In a further aspect, the present disclosure is directed to a computer-implemented method for configuring a heating, ventilation, and air conditioning (HVAC) system of a building, comprising receiving, by a processor, a floor plan of the building, wherein the floor plan includes a mapping of an HVAC system configuration to a first HVAC zone group; receiving, by the processor, a change to the HVAC system configuration associated with a first HVAC zone of the first HVAC zone group; determining, by the processor, whether a second HVAC zone group is mapped to a system configuration having the same properties as the changed HVAC configuration of the first zone. In some embodiments, the computer-implemented method includes responding to a determining that a second HVAC zone group is mapped to a system configuration having the same properties as the changed HVAC configuration of the first zone by removing the first zone from the first HVAC zone group and adding the first zone to the second HVAC zone group. In some embodiments, the computer-implemented method includes responding to a determining that a second HVAC zone group is not mapped to a system configuration having the same properties as the changed HVAC configuration of the first zone by removing the first zone from the first HVAC zone group, creating a new HVAC zone group, and adding the first zone to the new HVAC zone group. in some embodiments, the computer-generated method includes automatically assigning a new name to the new HVAC zone group. In some embodiments, the computer-generated method includes displaying, on a visual display in communication with the processor; zone of the new zone group using a different visual representation from that of the first zone group. A different visual representation includes a displaying in a different color, a different hatching, and/or a different background image.

BRIEF DESCRIPTION OF THE DRAWINGS

Various embodiments of the disclosed system and method are described herein with reference to the drawings wherein.

Figure 1:
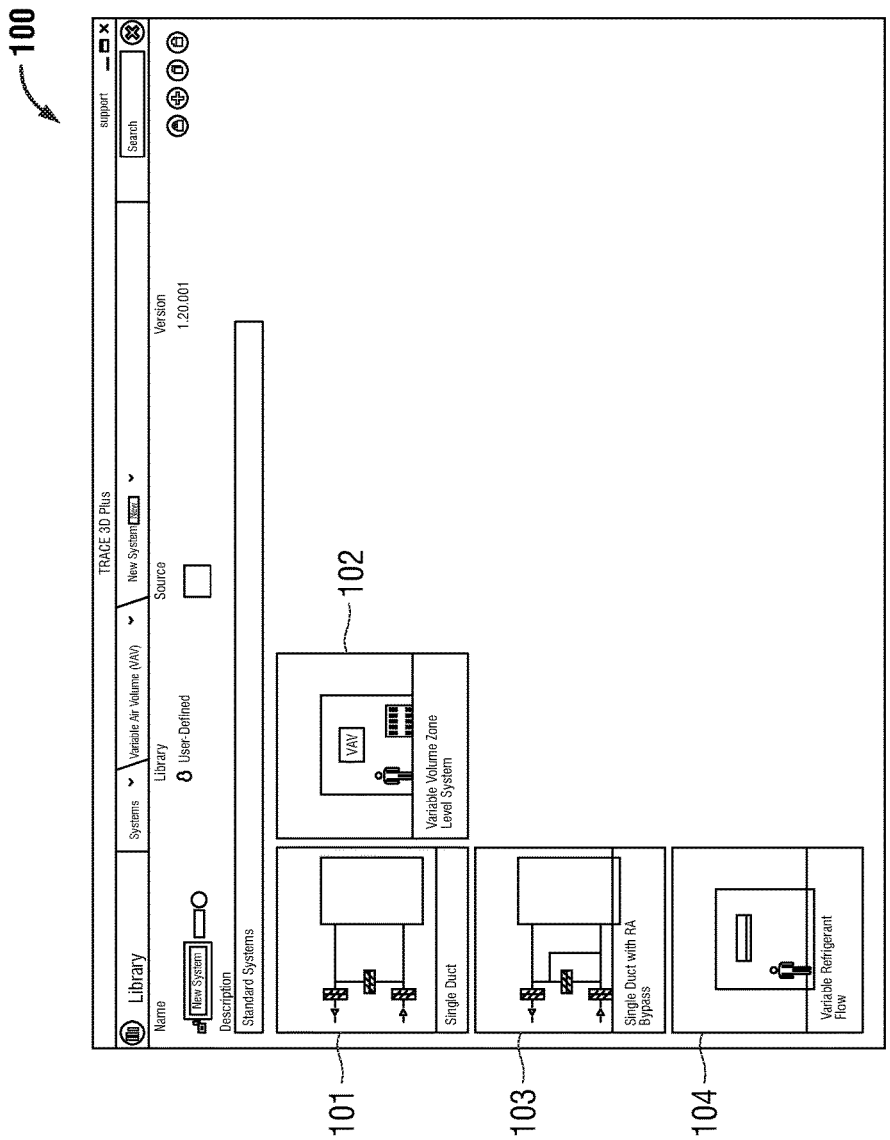
FIG. 1 depicts a system configurator in accordance with an exemplary embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. It should be appreciated that the particular implementations described herein are illustrative of the disclosure and its best mode and are not intended to otherwise limit the scope of the present disclosure in any way. One skilled in the art will also appreciate that, for security reasons, any element of the present disclosure may consist of any combination of databases or components at a single location or at multiple locations, wherein each database or system includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

The present disclosure is directed to methods and systems for designing and modeling an HVAC system of a structure. The system employs a rules-based HVAC system schematic generator which enables a user to select from among a number of predefined HVAC system configurations. Each systems configuration includes a plurality of HVAC components ("stencils") each having a set of rules defining the component's behavior, and descriptors defining the interconnect circuits (electrical, fluid, control) between components. The selected configuration is presented in schematic form to the user where it may be modified by the user as needed, to add, delete, or reposition specific HVAC components in the system configuration. As new components are selected, the predefined rules for each component are applied to the schematic to determine one or more candidate positions at which the selected component may be inserted into the configuration. An updated schematic showing the candidate positions for the new component is automatically generated and displayed. When a user places the new component in one of the candidate positions, the rules for each component and the interconnects are re-applied to the schematic and the schematic is again updated to reflect the new configuration. The new configuration may be added to the predefined HVAC system configurations.

A building may include one or more different HVAC system configurations. For example, a typical structure includes numerous climate control zones (rooms) having common system configurations, such as offices, conference rooms, warehouses, and so forth. The system includes a hierarchic zone assignment manager that organizes zones into zone groups, e.g., office zone group, conference room zone group, warehouse zone group. In the zone assignment manager the zones are presented as an architectural diagram of the structure, such as a 2D floor plan. For clarity, each zone group is represented using distinct visual characteristics (e.g., each zone has a different color, hatch pattern, background image, etc.) Each zone's system configuration is editable from within the zone assignment manager, which enables a user to rapidly generate derivative or alternative system configurations. In an example building, an office zone may consist of a VAV box, a temperature sensor, and associated HVAC components. However, certain offices in the example building have north-facing windows that cause additional heat loss, necessitating the addition of a convector to the system configuration to properly heat these north-facing offices. The system enables a user to select a room and modify the associated zone as needed (e.g., add a convector) which immediately 1) creates a new zone group associated with the new system configuration 2) removes the modified zone from its original zone group, and 3) joins the modified zone to the new zone group.

The disclosed system includes a simulation engine to evaluate the performance of the system, which, together with the rules-based system schematic generator and hierarchical zone manager, enables the design engineer to rapidly prototype, evaluate, and revise HVAC system designs.

Figure 2:
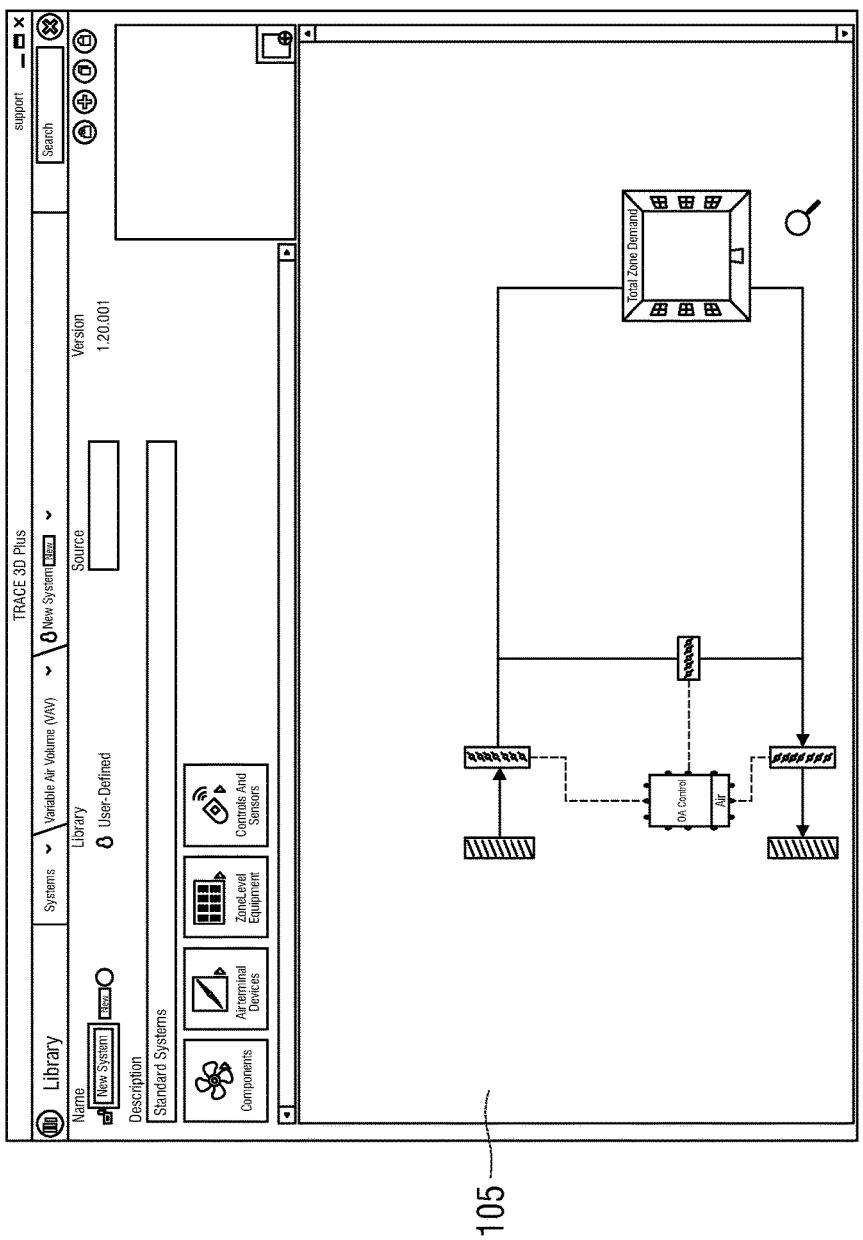
FIG. 2 depicts a system configurator in accordance with an exemplary embodiment of the present disclosure showing a system schematic diagram.
Figure 3:
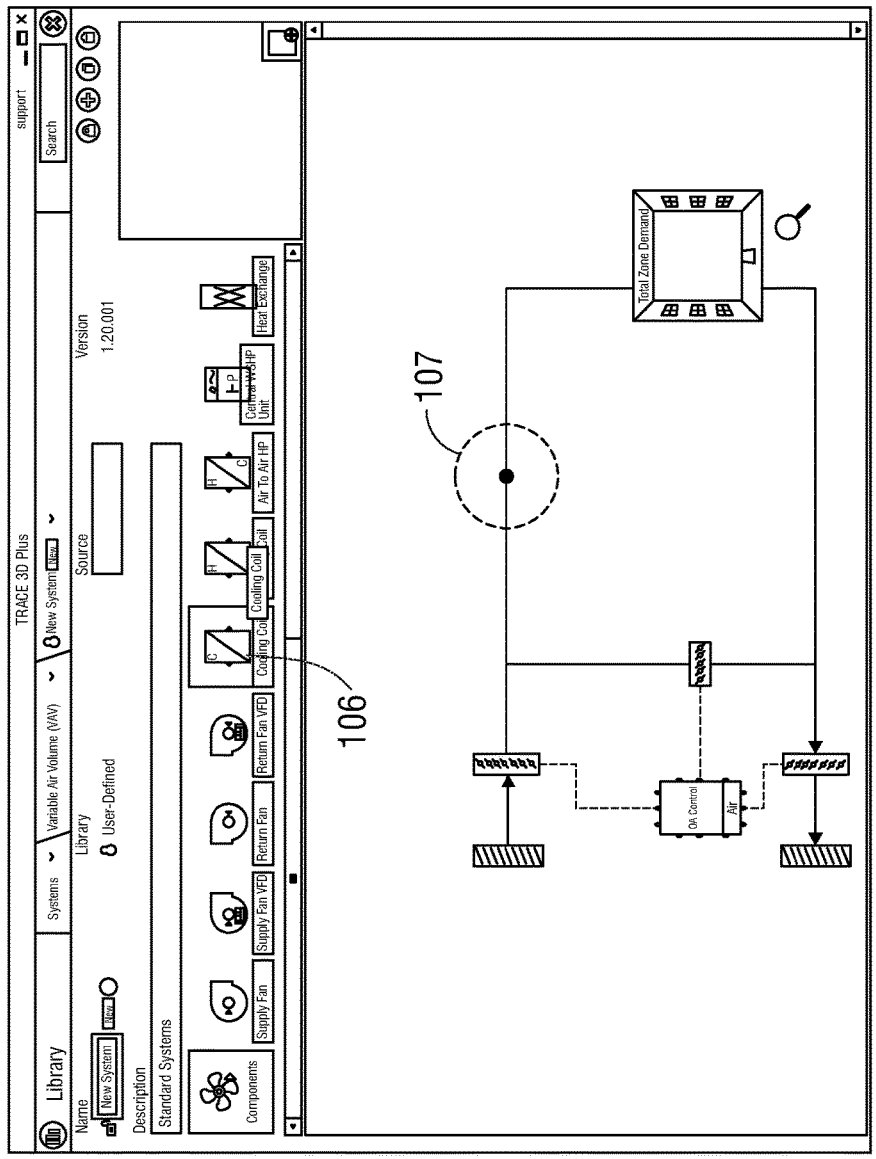
FIG. 3 depicts a system configurator in accordance with an exemplary embodiment of the present disclosure showing candidate device positions.
Figure 4:
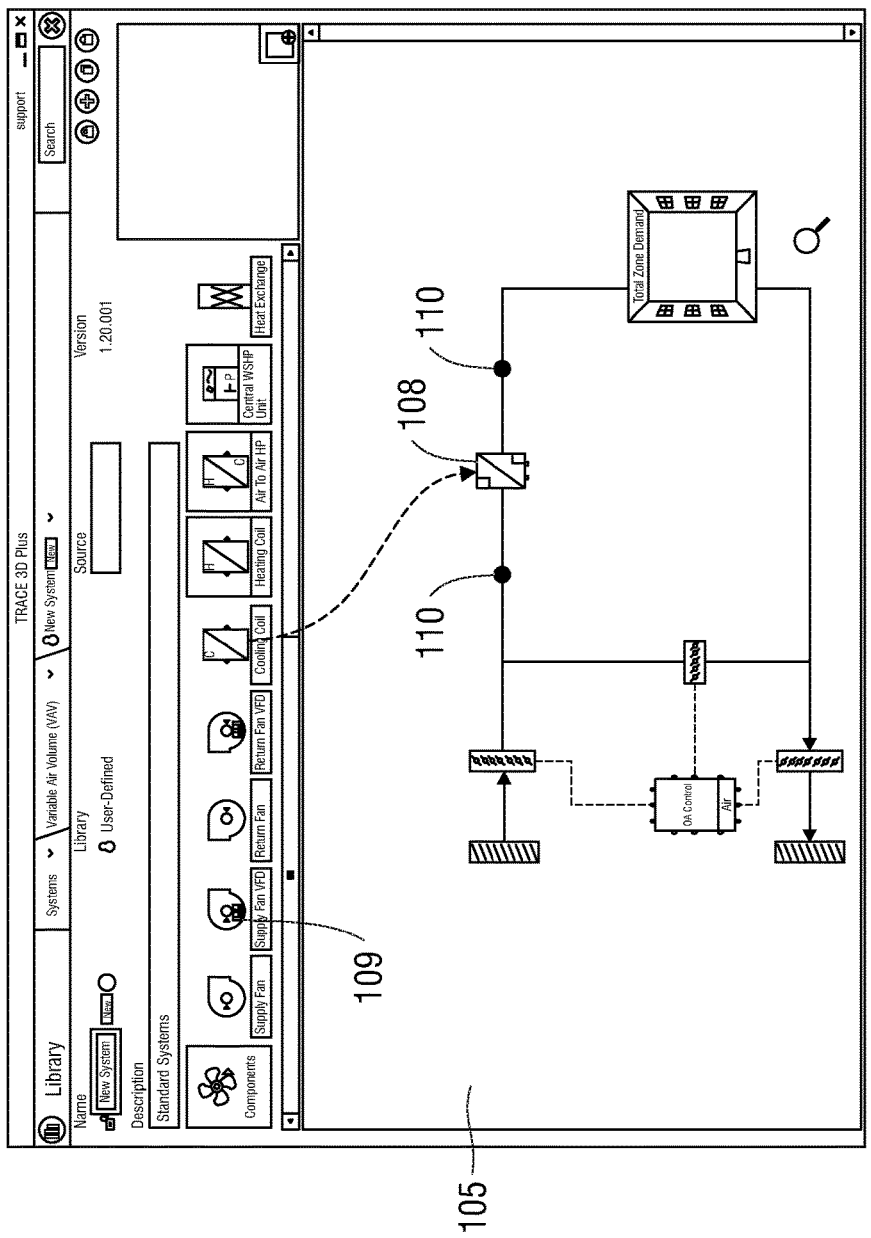
FIG. 4 depicts a system configurator in accordance with an exemplary embodiment of the present disclosure showing a system modification in place.

Turning to FIG. 1, a graphic display 100 presents a set of system configuration selection icons 101-104 representative of a predefined system HVAC system configuration. In FIG. 2, a system configuration has been selected and the core elements of the configuration are rendered in schematic form 105. In FIG. 3 a selection is made to add a cooling coil 106. The rules-based engine processed the predefined rules for cooling coil 106 to determine the candidate position(s) available for a cooling coil 106, which is indicated by position icon 107. The placement of cooling coil 106 to the system configuration is accomplished by dragging cooling coil 106 to the desired position 107. Immediately upon placement the rules based engine updates schematic 105 to show cooling coil 108 in the specified position (FIG. 4). The design engineer may elect to make further modifications, for example, to add a central water source heat pump (WSHP) unit or a variable speed supply fan 109. In this case the designer selects variable speed drive (VSD) supply fan 109 which again invokes the rules based engine, which, in turn, generates position icons 110 to indicate candidate positions for a VSD supply fan 109.

Figure 5:
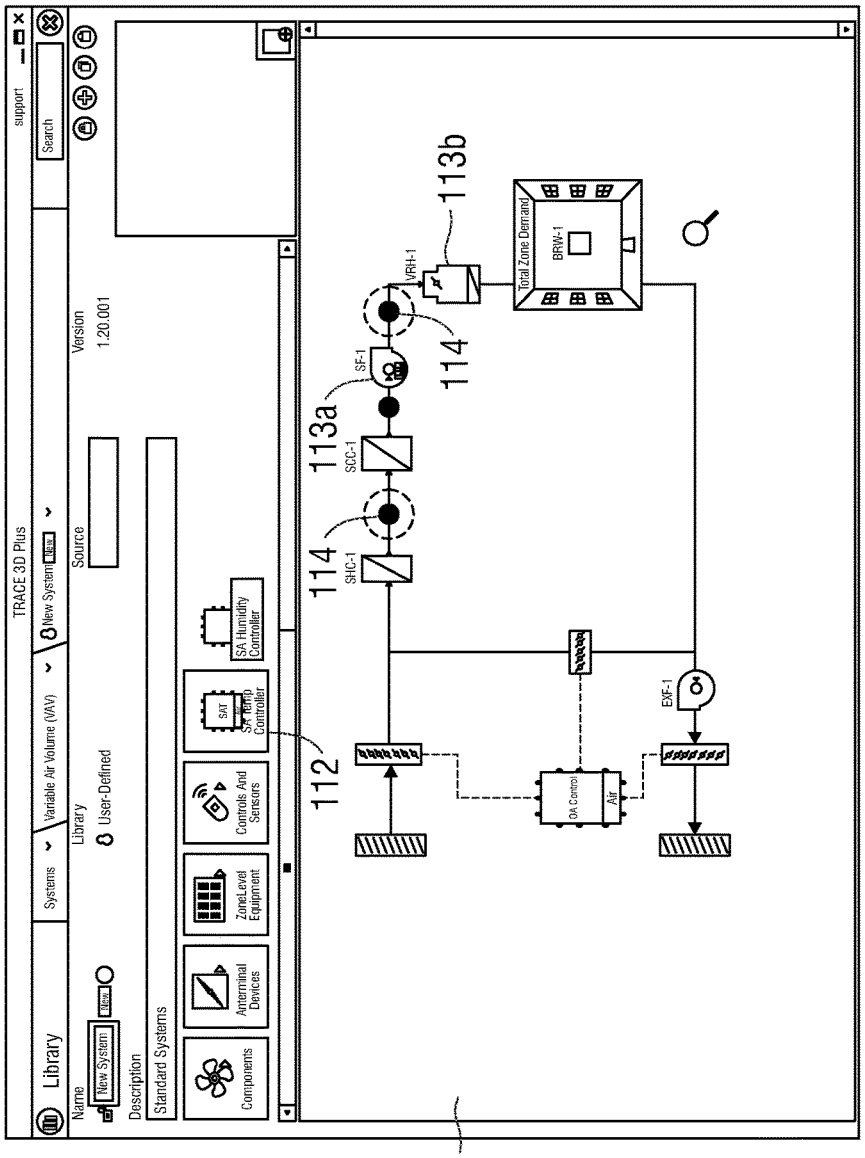
FIG. 5 depicts a system configurator in accordance with an exemplary embodiment of the present disclosure showing additional system modifications in place.
Figure 6:
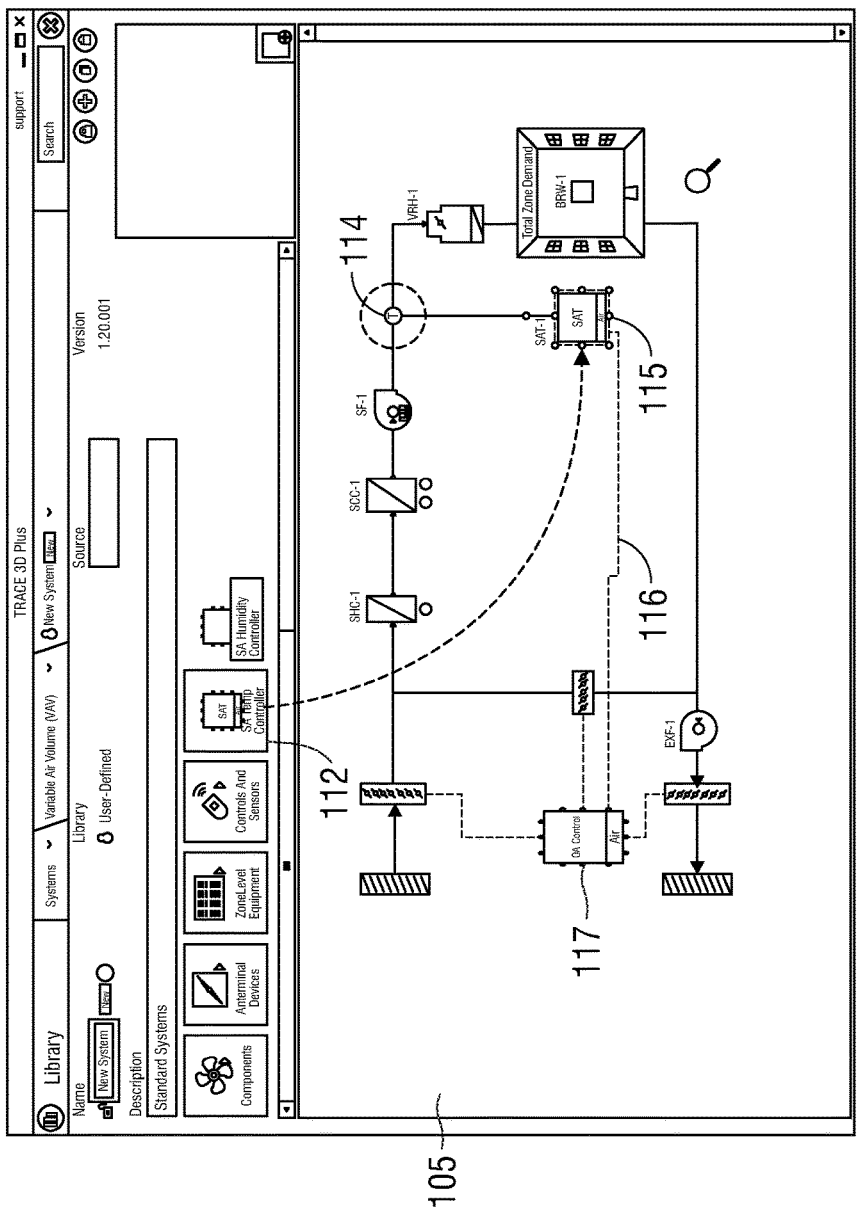
FIG. 6 depicts a system configurator in accordance with an exemplary embodiment of the present disclosure showing control connections.
Figure 7:
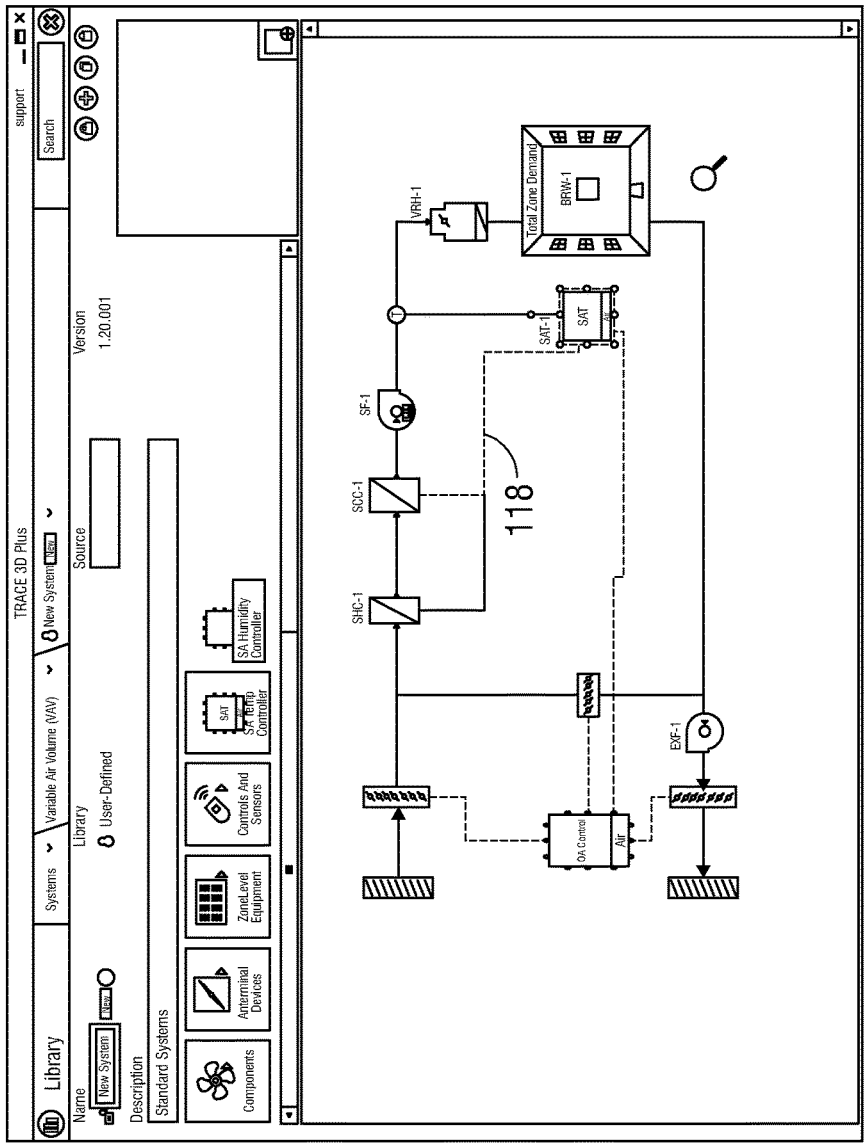
FIG. 7 depicts a system configurator in accordance with an exemplary embodiment of the present disclosure showing further control connections.

FIGS. 5-7 illustrate the steps of automatically configure control elements and HVAC elements in context of the overall system configuration as control elements are added to the system configuration. In FIG. 5 a VFD supply fan 113a and a VAV reheat box (VRH) 113b have been added to schematic 105. A selection is made to add a temperature controller 112 and candidate placements 114 are displayed. In FIG. 6 the design engineer drags temperature controller tile 112 to the desired position, which immediately invokes the rules-based engine to add new temperature controller 115 to schematic 105. The rules-based engine processes rules for each component of the system configuration, whether the component is existing or newly-added, to ensure, at all times that a correct and valid system configuration is being developed. For example, here, the control circuit 116 necessary to communicatively couple temperature controller 115 and system controller 117 is automatically generated. Additional control lines 18 may be defined by the design engineer as shown in FIG. 7.

Figure 8:
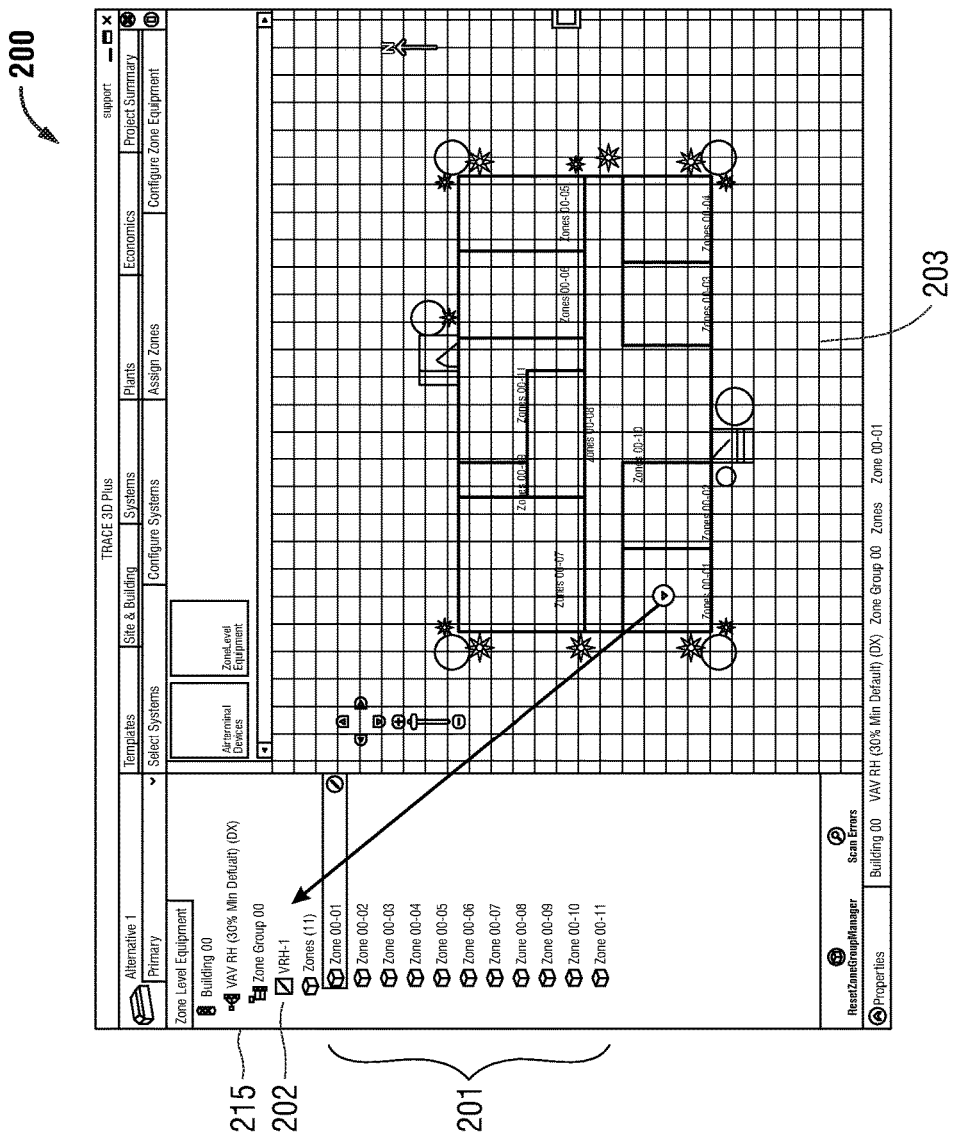
FIG. 8 depicts a zone group manager in accordance with an exemplary embodiment of the present disclosure.

FIGS. 8-13 illustrate an exemplary embodiment of a hierarchic zone manager 200 in accordance with the present disclosure. An initial zone hierarchy 201 is automatically created by zone management logic, based on a zone-HVAC system association to identify zones with common components which are operatively associated with the particular HVAC system under development. Note that a single building may incorporate one or more HVAC systems. As seen in FIG. 8, VRH-1 (202) represents VAV boxes with reheat coils which is shared by each zone of Zone Group 00 (215) displayed in the hierarchy. Zone Group 00 (215) is associated with a single HVAC system configuration, and each zone listed in the hierarchy 201 corresponds to a zone shown on floor plan 203. For clarity, floor plan 203 depicts all zones that currently use the same zone level equipment using the same color.

Figure 9:
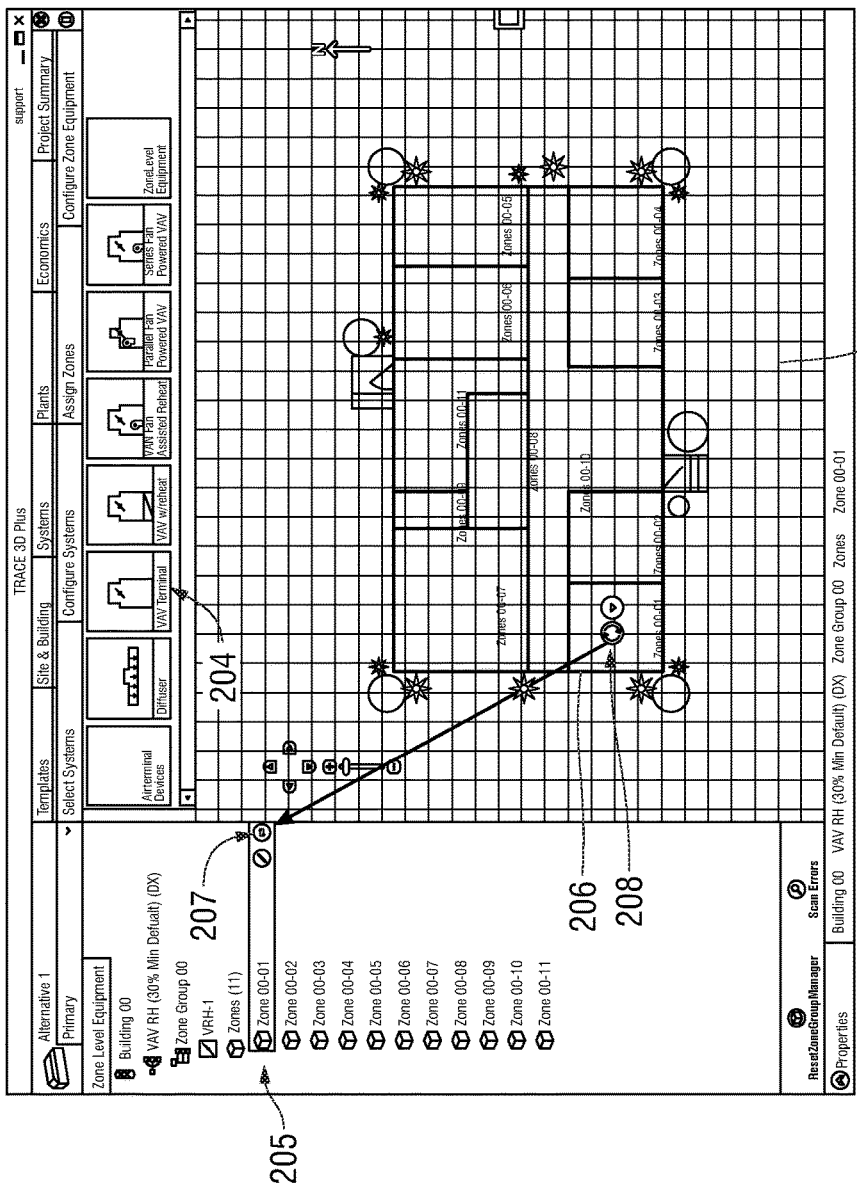
FIG. 9 depicts a zone group manager in accordance with an exemplary embodiment of the present disclosure showing a new component selection.

To add a zone-level component to a zone (e.g., add a component to a particular room), the component to be added is selected. Here, for example, VAV terminal 204 is being added. The zone to which the component will be added, Zone00-01 (205) is also selected. As shown in FIG. 9, zone selection may be performed by selecting the target zone in the hierarchy (205) to reveal an edit icon 207 associated with the hierarchical listing or, alternatively, by selecting the target zone in the floor plan (206) to reveal an edit icon 208 associated with the zone graphic in floor plan 203. Clicking on either edit icon 207 or 208 enables the design engineer to add, delete, or modify the component(s) on the selected zone 205.

After zone modification is complete, the zone management logic attempts to identify an existing zone group which shares the characteristics of the just-modified Zone00-01 (205). If one exists, the modified zone is removed from its original zone group and added to the identified zone group.

Figure 10:
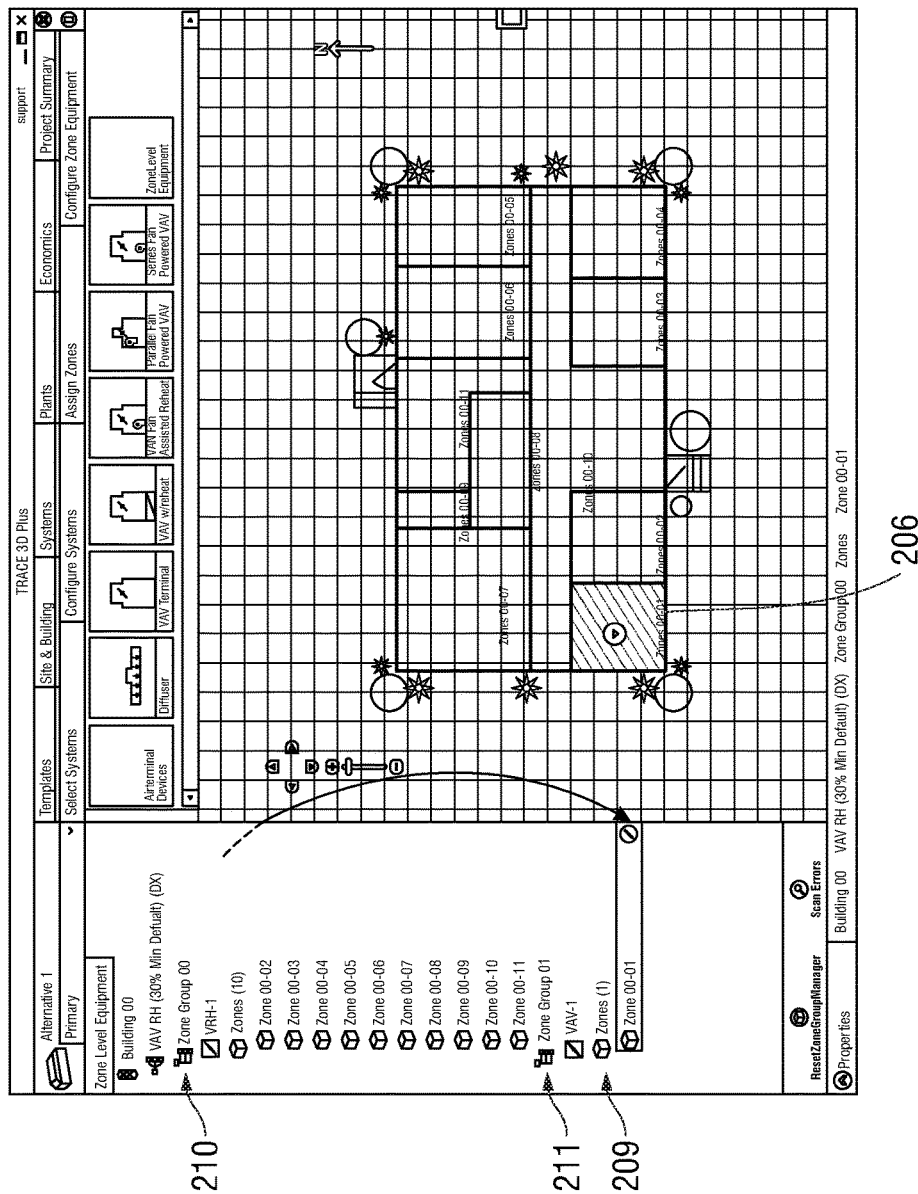
FIG. 10 depicts a zone group manager in accordance with an exemplary embodiment of the present disclosure showing automatic zone group creation.

No such zone group exists, so a new zone group is automatically created. As shown in FIG. 10, Zone00-01 has been modified therefore is removed from Zone Group 00 (210) and moved into new Zone Group 01 (211). A new zone group name "Zone Group 01" is automatically generated to identify the newly-created zone group within the hierarchy. Floor plan 203 is updated to show the new zone group in the floor plan (206) in a distinct visual format from other zone groups (e.g., different color, hatching, background photograph, etc.).

Figure 11:
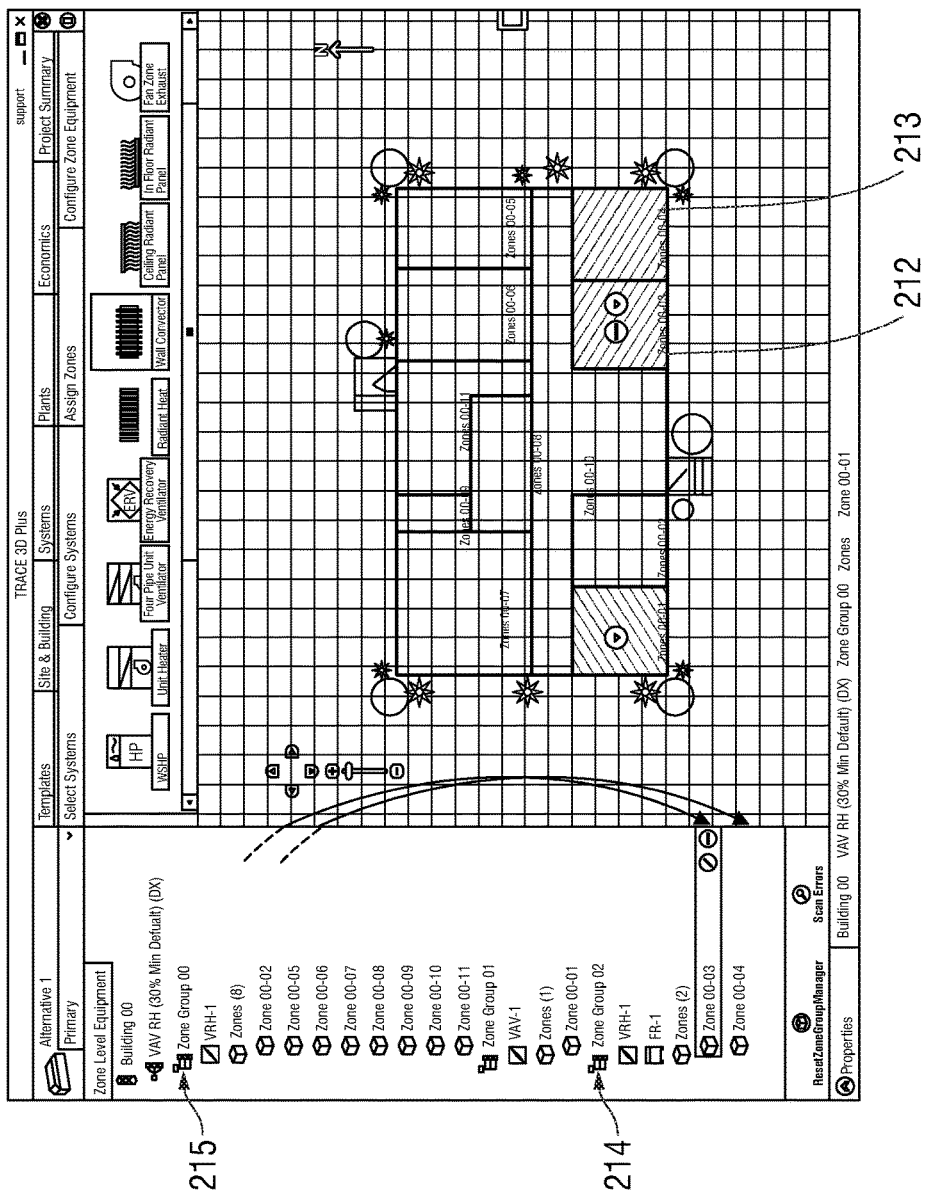
FIG. 11 depicts a zone group manager in accordance with an exemplary embodiment of the present disclosure showing an automatically generated zone group consisting of two new zones.
Figure 12:
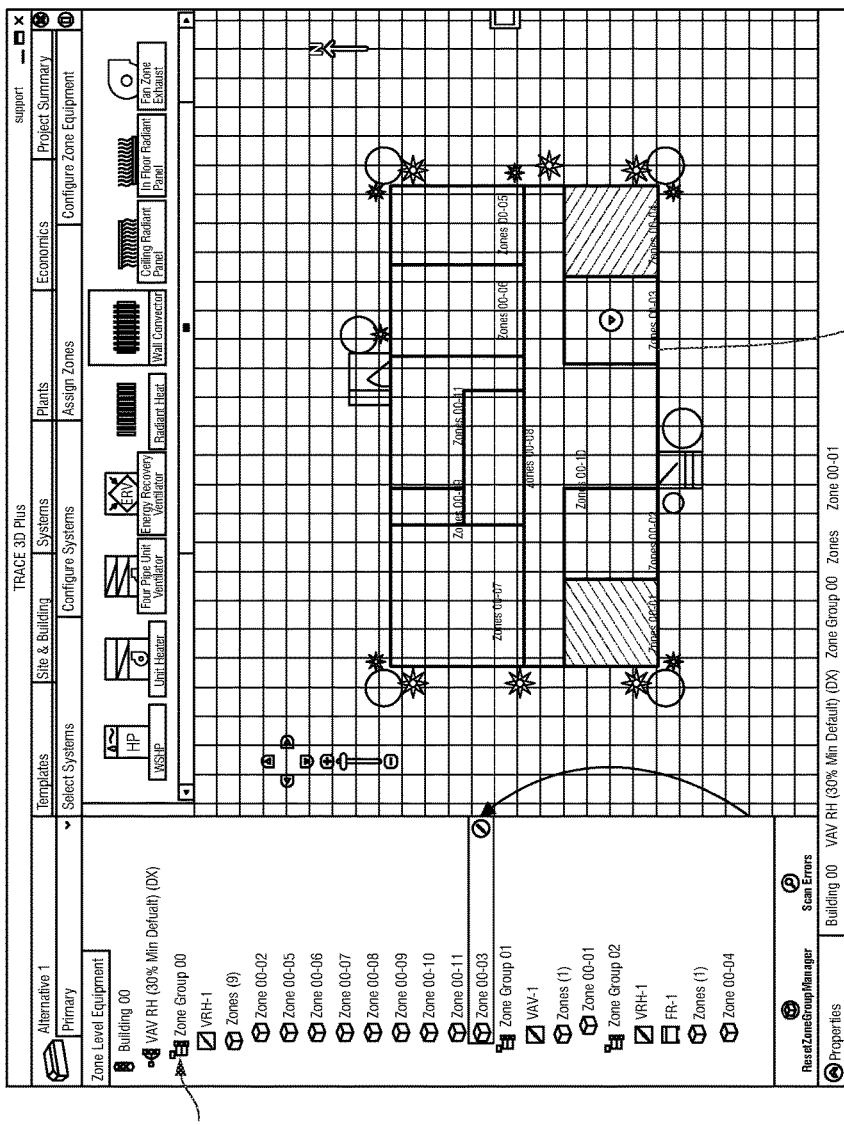
FIG. 12 depicts a zone group manager in accordance with an exemplary embodiment of the present disclosure showing a zone rejoined to its original zone group.

FIG. 11 illustrates the automatic creation of a new zone group 214 where multiple zones have been modified. Zones 212 and 213 are moved from Zone Group 00 (215) to newly-created Zone Group 02 (214) resulting from the addition of a wall convector to each of those zones. In FIG. 12, zone 212 is modified a second time to remove the wall convector. In response, the zone management logic moves Zone00-03 (212) from Zone Group 02 back to Zone Group 00.

Figure 13:
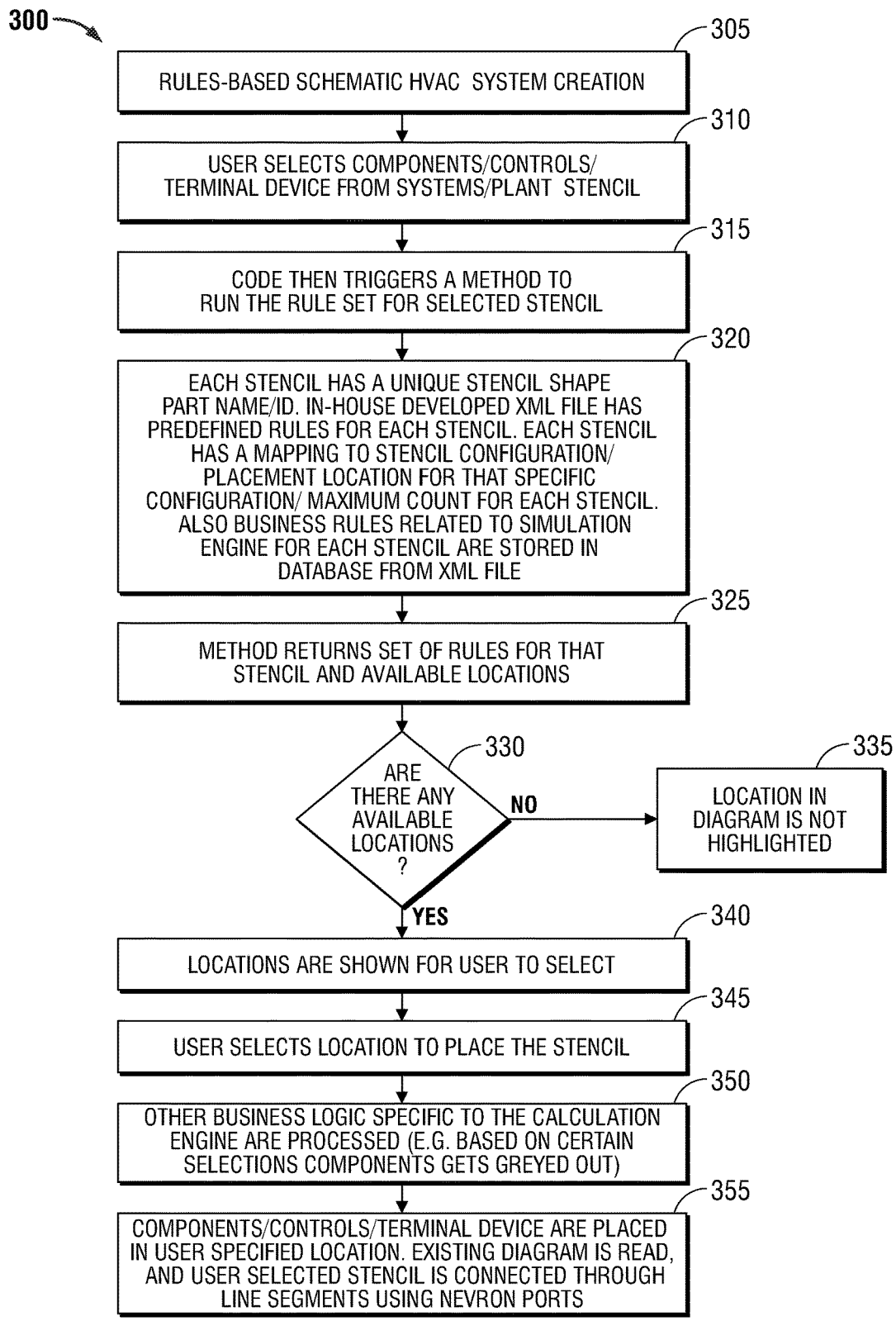
FIG. 13 is a flow chart illustrating a method of HVAC system device configuration in accordance with an exemplary embodiment of the present disclosure.

FIG. 13 illustrates a method of rules-based HVAC schematic generation 300 in accordance with an exemplary embodiment of the present disclosure. In the step 305 an initial user interface consisting of device templates (stencils), configuration (plant) templates, and a schematic workspace is generated by a presentation layer. Device templates may include terminal devices (e.g., VAV boxes), system components (e.g., cooling coils), control devices (e.g., temperature controllers), and/or any component suitable for use in an HVAC system. In the step 310, one or more HVAC components, control devices, and/or terminal devices are selected from a system or plant template. In the step 315, a rules-based engine is invoked to run a rule set for the selected elements to ensure compliance with acceptable HVAC engineering practice and error checking. In step 320 the necessary rules are retrieved from a rules database. Each template has a unique stencil-shaped part name and identifier. A specially-developed XML file includes predefined rules for each stencil. Each stencil includes a mapping of a stencil to configuration and placement candidate locations for that specific configuration. A maximum device count for each stencil may be included to limit the number of instances a particular device may appear in the schematic or building. Performance and business rules (cost, energy efficiency etc.) which may be utilized by the simulation engine for each stencil are stored in database in XML form.

In the step 325 the appropriate rules are retrieved from the database and evaluated in the step 330 to determine which, if any, available locations exist at which to place the device template selected in the step 310. If no locations are available, then in step 335 no candidate locations are indicated on the schematic, and, additionally or alternatively, a message is generated to inform the user the selected template may not be used. Otherwise, if candidate locations exist, in the step 340 the candidate locations are indicated on the schematic. In the step 345, the location at which to place the device template is selected. In the step 350, a set of performance and business rules are applied to the schematic. In some instances, depending on applicable performance and business rules, one or more components may become unavailable for use in the current configuration. In this case, an indication that certain components are now unavailable is generated (e.g., greyed-out icon, alert box message, etc.). In the step 355, the selected device template is placed in the user-specified location, and any necessary connections (fluid, power, control) are automatically generated and displayed in the schematic.

Figure 14:
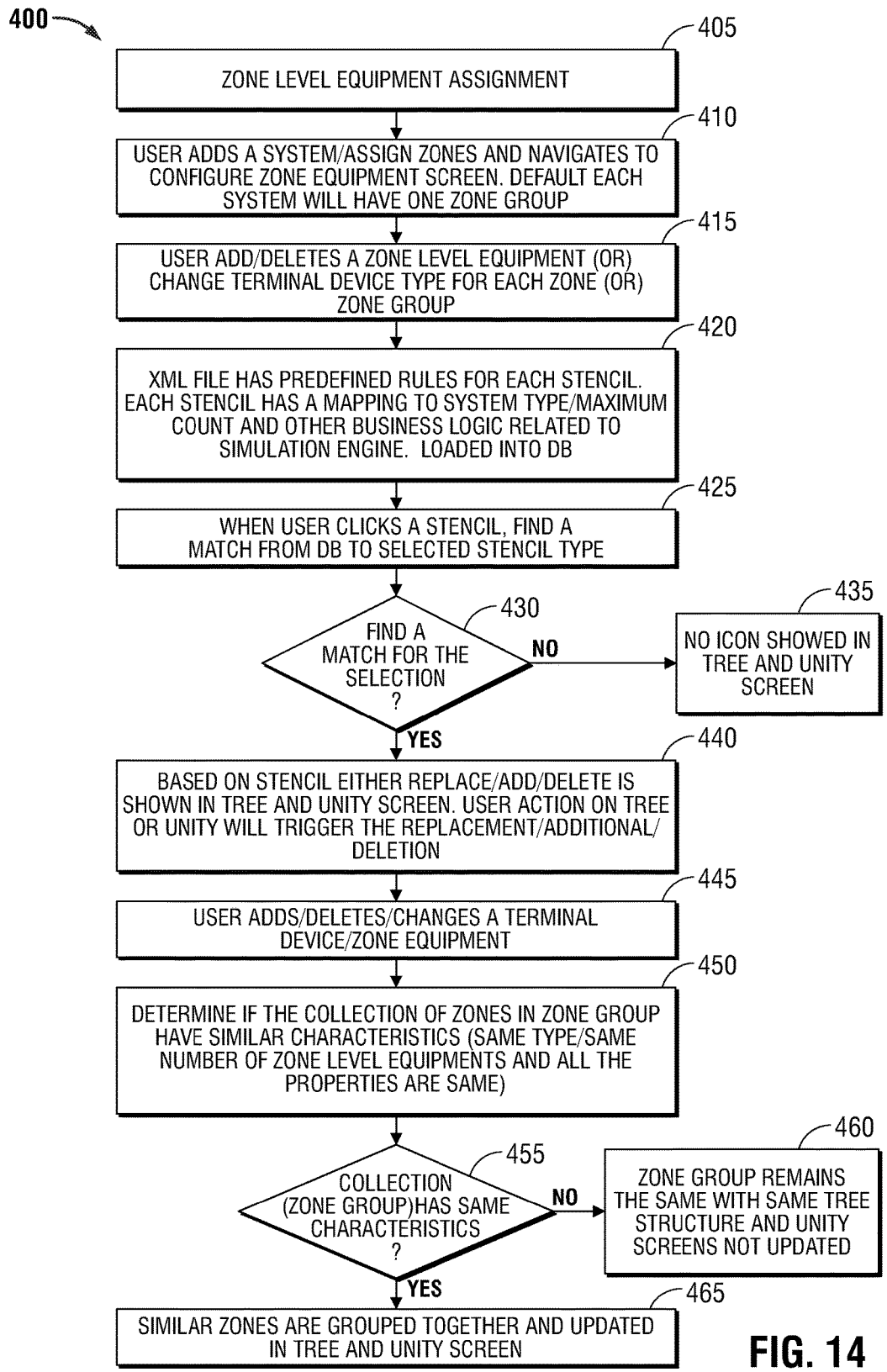
FIG. 14 is a flow chart illustrating a method of HVAC zone group management in accordance with an exemplary embodiment of the present disclosure.

FIG. 14 illustrates a method of zone group management 400 in accordance with an exemplary embodiment of the present disclosure. The method begins with the step 405 wherein the initial zone hierarchy is displayed. The zone hierarchy may be displayed in a list form with expandable/collapsible elements and in a floor plan form showing the room/zone association. In the step 415 a zone from which a component is to be added, deleted, or have a component property modified, is selected. In step 420, a specially-developed XML file that includes predefined rules for each component is retrieved. Each component is represented by a template that maps the component to configuration and placement candidate locations for the zone configuration. A maximum device count for each may be included to limit the number of instances a particular device may appear in the schematic or building. Performance and business rules (cost, energy efficiency etc.) which may be utilized by the simulation engine are stored in database in XML form. In the step 425, a device template to be added or deleted from the desired zone is selected, and in the step 430, an attempt is made to match the selected device template to the set of devices in the selected zone. If no match is identified, then in the step 435 no icon is displayed and/or an error message is displayed. Otherwise, a match is identified and in the step 440 the selected change is applied to the zone, e.g., the device template selected in step 425 is added or deleted to the zone. In the steps 450 and 455, zone management logic determines if the modified zone has the same set of devices (same control, terminal, and system components) as that of another member of the zone group. If it does, in the step 460 no change is made to the zone group. Otherwise, in the step 465 if the modified zone includes a dissimilar set of devices, then an attempt is made to identify another zone group which shares the same set of devices as the modified zone. If such as zone group is found, the modified zone is moved to that zone group. If no such zone group exists, one is created and the modified zone is moved into the newly-created zone.

Figure 15:
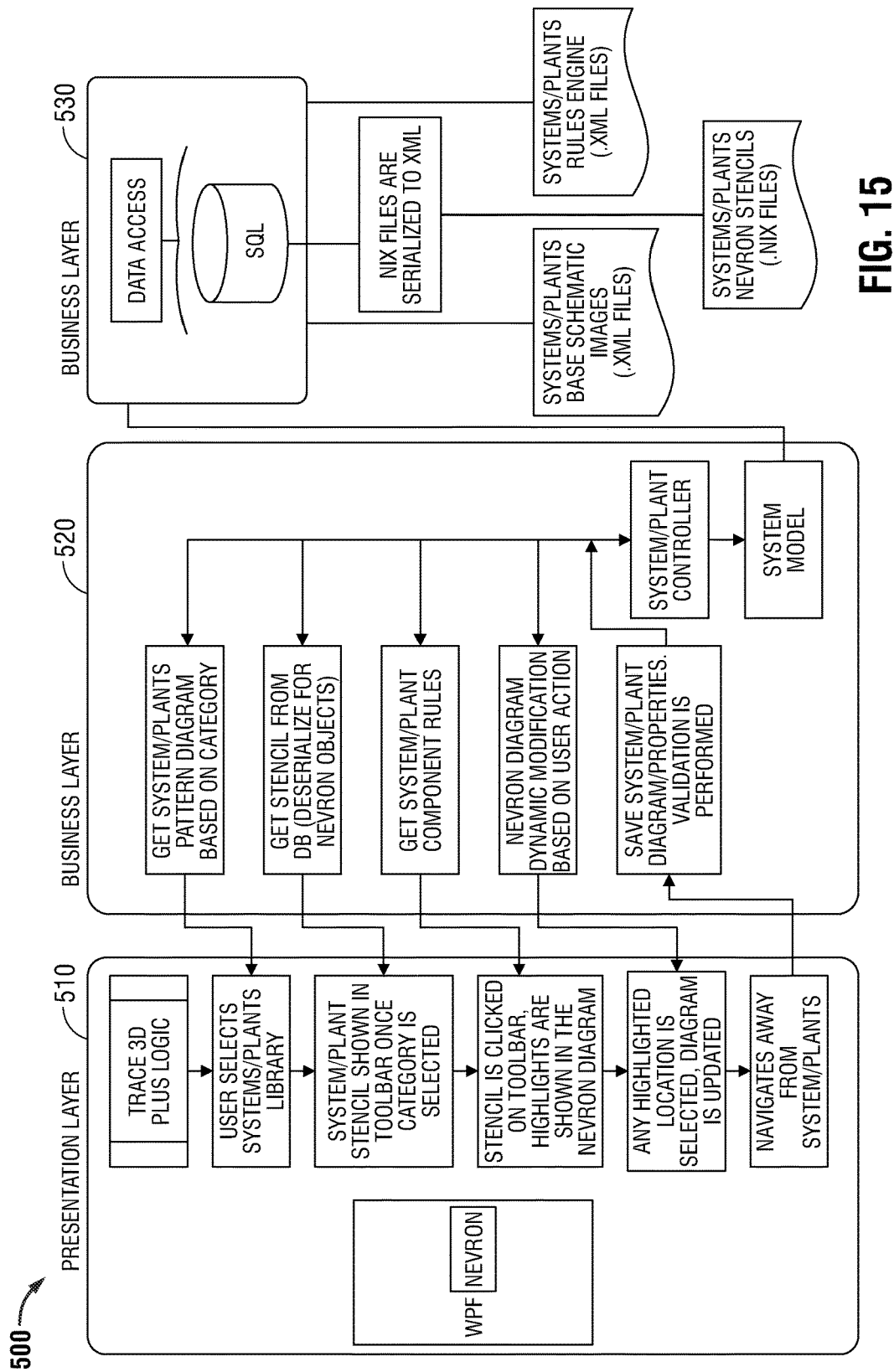
FIG. 15 is a data architecture diagram of an HVAC system device configurator in accordance with an exemplary embodiment of the present disclosure.
Figure 16A:
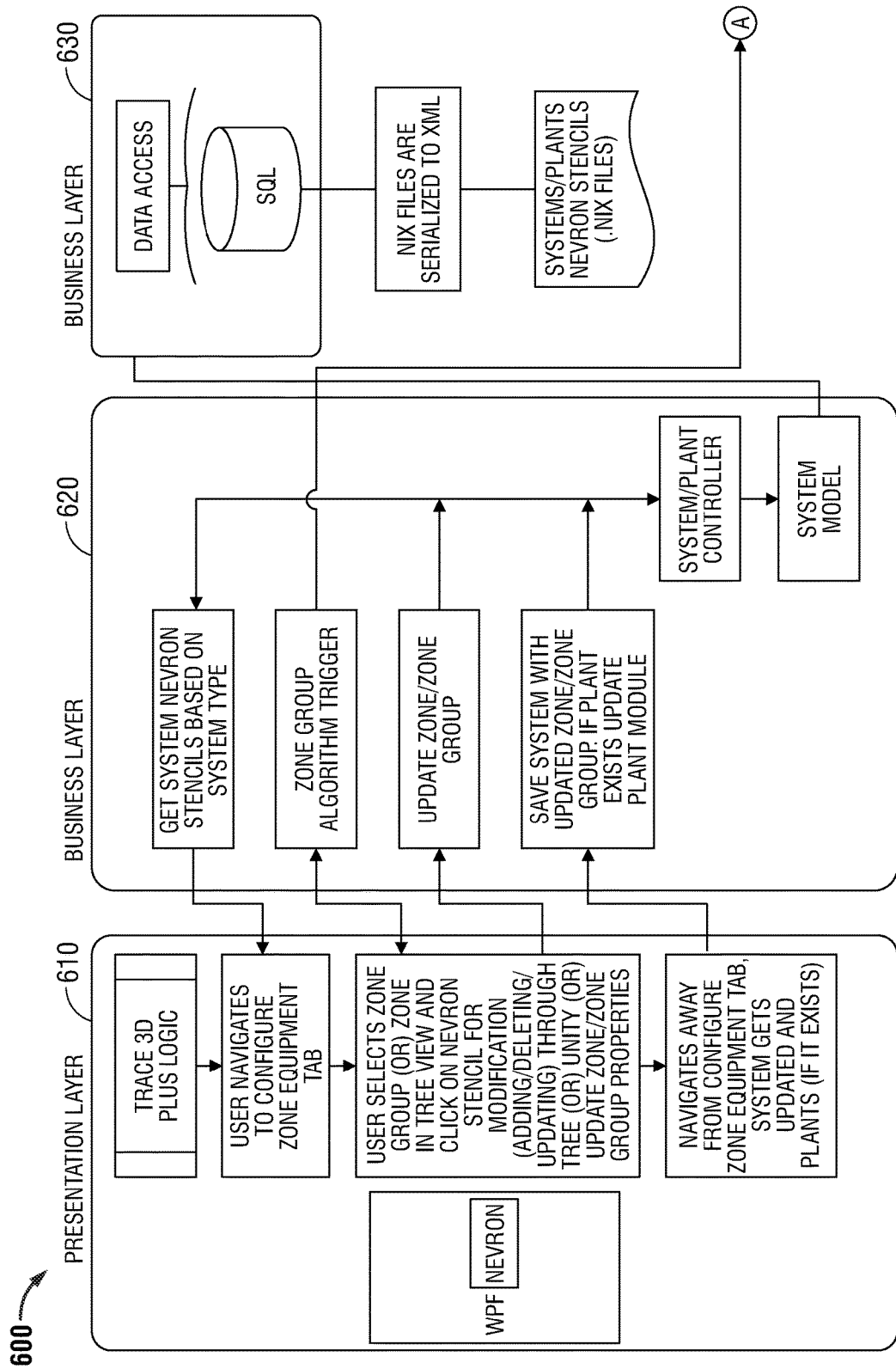
FIGS. 16A and 16B are a data architecture diagram of an HVAC zone group manager in accordance with an exemplary embodiment of the present disclosure.
Figure 16B:
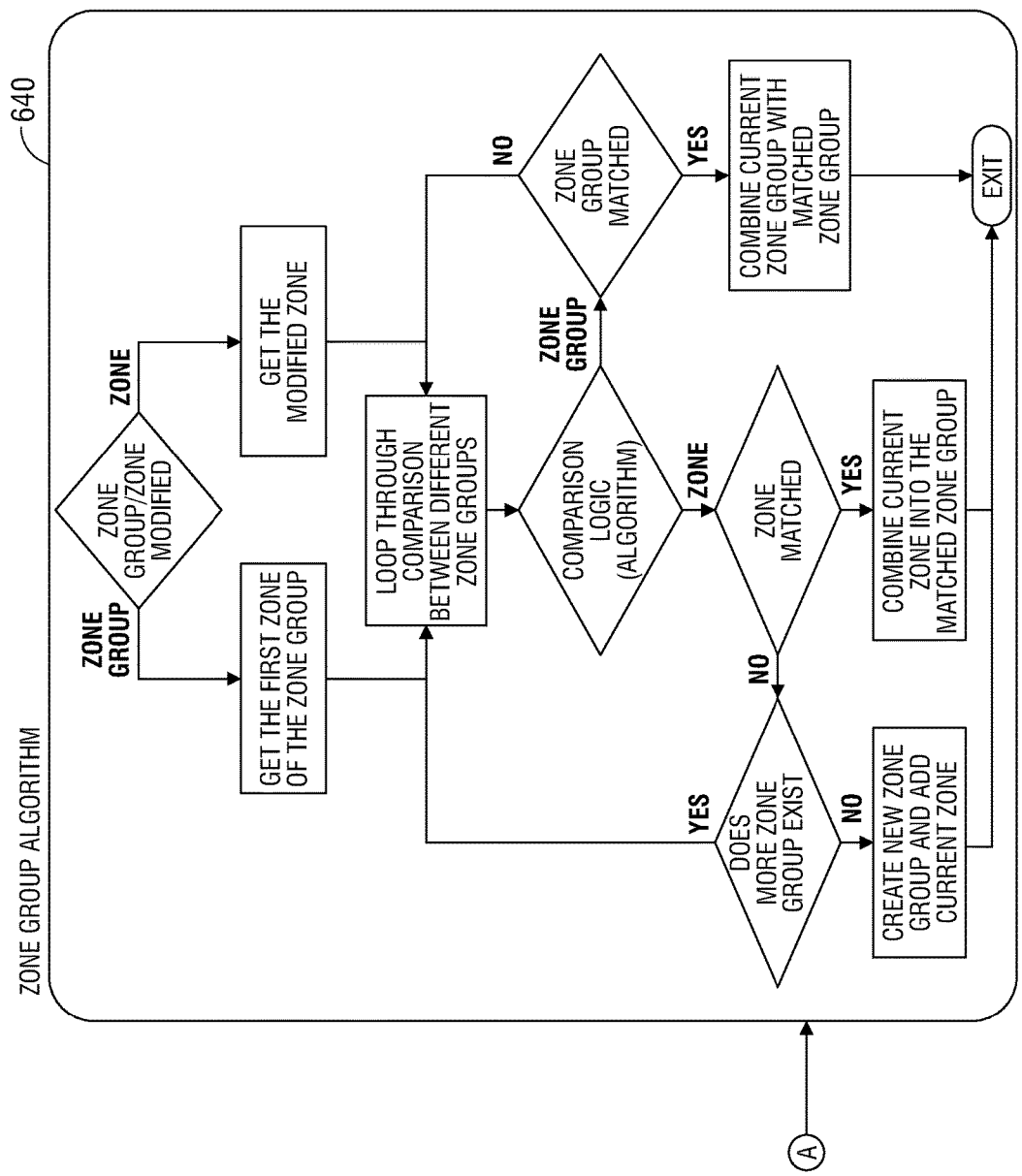

FIG. 15 illustrates a data architecture of a schematic system configurator 500 in accordance with an exemplary embodiment of the present disclosure that includes a presentation layer 510, a rules layer 520, and a data access layer 530. FIG. 16 illustrates a data architecture of a zone group manager 600 that includes a presentation layer 610, a rules layer 620, a data access layer 630, and zone group analysis engine 640.

Figure 17:
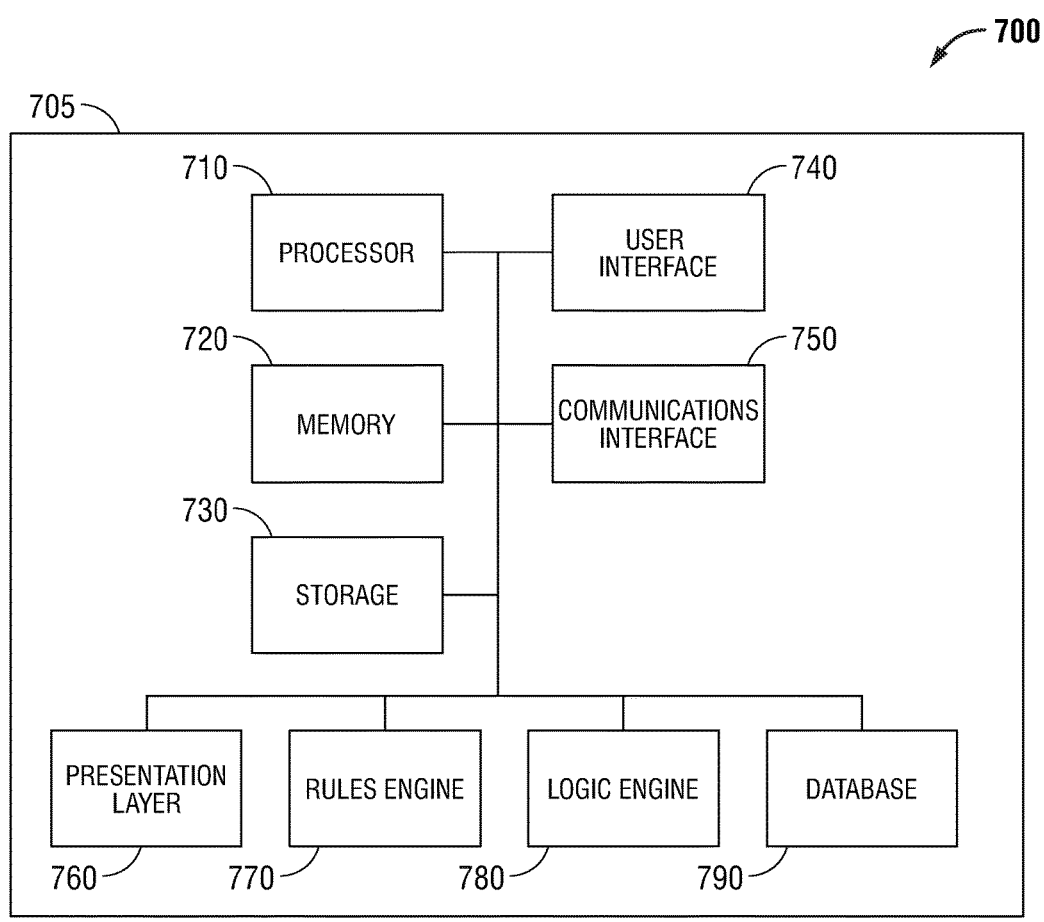
FIG. 17 is block diagram of an exemplary embodiment of an HVAC design, modeling, and simulation system in accordance with the present disclosure.

FIG. 17 depicts an exemplary embodiment of a system 700 for designing, modeling, and simulation of an HVAC system in accordance with the present disclosure. System 700 includes a computing device 705 having in operative communication a processor 710, a memory 720, and storage 730. Computing device 705 can include, for example, a laptop computer, a desktop computer, or a mobile device (e.g., a mobile phone, a personal digital assistant, etc.), or any other type of computing device now or in the future known. Memory 720 includes RAM memory which can be used, for example, for storage of transient data, computed and intermediate results, I/O buffering, graphical user interface (GUI) buffering, and for software program execution.

Storage 730 comprises non-volatile storage such as a NAND flash drive, EEPROM, ROM, magnetic hard disk, solid state disk (SSD), hybrid drives (combination hard disk/SSD) which can be used for storage of a data which persists through power cycling. Computing device 705 includes user interface 740 that enables a design engineer to interact with the system 700. User interface 740 may include a keyboard, pointing device, touchscreen, speech recognition, gesture-based interface, or other input device that receives user inputs, such inputting or downloading building floor plans; selection of HVAC system configurations, components, and control devices, defining and modifying characteristics of zones and zone groups; and other user inputs relating to the various other aspects of the present disclosure. User interface 740 includes one or more visual displays, which may include, without limitation, a monitor screen or monitor interface, browser interface, a virtual graphics output device, and a remote access interface.

Computing device 705 includes a communications interface 750 for communication between system 700 and other systems and devices to enable receiving and transmitting data in connection with aspects of the present disclosure, for example, downloading building floor plans, receiving updates relating to system configurations, HVAC components, rules updates, software updates, communication of design, modeling, and simulation data, climate data, error logging and reporting, and so forth.

Still referring to FIG. 17, system 700 includes presentation layer 760, rules engine 700, logic engine 780, and database 790. Presentation layer 760 interacts with user interface 740 to interpret user inputs, format and present visual representations of schematics, floor plans, templates, stencils, icons and other visual elements of the disclosed invention. Presentation layer 760 may include executable data presentation software such Windows Presentation Foundation, Nevron, and the like. Rules engine 770 interprets and processes rules-based criteria in connection with the schematic system configurator and zone group management. Logic engine 780 receives and transmits data to and from presentation layer 760, rules engine 770, and database 790 to facilitate operation of the disclosed invention, including without limitation, the analysis, matching and creation of zone groups. Database 790 includes a relational database such as SQL Server for efficient storage and retrieval of data relating to the operation of the disclosed invention, such as without limitation, XML templates, rules, zone configurations, and so forth.

ASPECTS

It is noted that any of aspects 1-17 may be combined with each other in any combination.

Aspect 1. A method for constructing an HVAC system for a structure having distinct thermal zones, comprising the steps of defining the structure; defining an HVAC topology included in the structure; identifying common elements of the HVAC topology associated with a distinct thermal zone; defining a zone group comprising distinct zones sharing similar common elements; modifying the zone group if at least one distinct zone of the zone group no longer shares common elements with at least one other distinct zone of the zone group; generating a set of HVAC parameters for the structure.

Aspect 2. The method in accordance with aspect 1, wherein the step of defining an HVAC topology included in the structure comprises defining one or more HVAC components included in the structure.

Aspect 3. The method in accordance with any of aspects 1-2, wherein the step of defining an HVAC topology included in the structure comprises defining an interconnection between one or more HVAC components included in the structure.

Aspect 4. The method in accordance with any of aspects 1-3, wherein the step of modifying the zone group comprises removing from the zone group the distinct zone that no longer shares common elements with at least one other distinct zone of the zone group; and adding the removed distinct zone to a different zone group comprising distinct zones sharing similar common elements with the removed distinct zone.

Aspect 5. The method in accordance with any of aspects 1-4, wherein defining an HVAC topology included in the structure comprises providing a set of pre-defined characteristics of an HVAC component, wherein the pre-defined characteristics include a configuration rule and a simulation rule; inserting a representation of a distinct thermal zone into a zone tree; joining the HVAC component to at least one other HVAC component in the distinct thermal zone, if any, based upon the pre-defined characteristics of the respective HVAC components.

Aspect 6. The method in accordance with any of aspects 1-5, wherein the set of pre-defined characteristics of an HVAC component are expressed in an extensible markup language.

Aspect 7. The method in accordance with any of aspects 1-6, wherein inserting the representation into a zone tree representative of a distinct thermal zone includes storing the configuration rule and the simulation rule in third normal form.

Aspect 8. A method for constructing an HVAC system model of a structure having distinct thermal zones, comprising the steps of defining the structure; defining a plurality of HVAC components included in the structure; defining interconnections between two or more of the plurality of HVAC components included in the structure; identifying a further HVAC component to be inserted into an interconnection of the structure; and identifying a candidate interconnection into which the further HVAC component may be inserted.

Aspect 9. A method, comprising displaying a plurality of HVAC system configurations in a viewer executing on an electronic device having a graphic display;

receiving, at the electronic device, a user selection of HVAC system configuration displaying the selected HVAC system configuration in the viewer displaying a plurality of HVAC components in the viewer receiving, at the electronic device, a user selection of a HVAC component applying a rules-based engine to determine the possible locations within the HVAC system configuration where the selected HVAC component may be placed; and displaying the possible locations the selected HVAC component may be placed on the HVAC system configuration in the viewer.

Aspect 10. A computer-implemented method for configuring a heating, ventilation, and air conditioning (HVAC) system of a building, comprising receiving, by a processor, a floor plan of the building; receiving, by the processor, an HVAC system configuration selected from among a set of template HVAC configurations; receiving, by the processor, an HVAC component selected from among a set of template HVAC components; determining, by the processor, a candidate position for the HVAC component within the HVAC system configuration; and displaying, on a visual display in communication with the processor; the candidate position for the HVAC component on a schematic diagram of the HVAC system configuration.

Aspect 11. A computer-implemented method for configuring a heating, ventilation, and air conditioning (HVAC) system of a building, comprising receiving, by a processor, a floor plan of the building, wherein the floor plan includes a mapping of an HVAC system configuration to a first HVAC zone group; receiving, by the processor, a change to the HVAC system configuration associated with a first HVAC zone of the first HVAC zone group; determining, by the processor, whether a second HVAC zone group is mapped to a system configuration having the same properties as the changed HVAC configuration of the first zone.

Aspect 12. The computer-implemented method in accordance with aspect 11, further comprising responding to a determining that a second HVAC zone group is mapped to a system configuration having the same properties as the changed HVAC configuration of the first zone by removing the first zone from the first HVAC zone group and adding the first zone to the second HVAC zone group.

Aspect 13. The computer-implemented method in accordance with any of aspects 11-12, further comprising responding to a determining that a second HVAC zone group is not mapped to a system configuration having the same properties as the changed HVAC configuration of the first zone by removing the first zone from the first HVAC zone group, creating a new HVAC zone group, and adding the first zone to the new HVAC zone group.

Aspect 14. The computer-implemented method in accordance with any of aspects 11-13, further comprising automatically assigning a new name to the new HVAC zone group.

Aspect 15. The computer-implemented method in accordance with any of aspects 11-14, further comprising displaying, on a visual display in communication with the processor; zone of the new zone group using a different visual representation from that of the first zone group.

Aspect 16. The computer-implemented method in accordance with any of aspects 11-15, wherein a different visual representation includes a different color, a different hatching, and/or a different background image.

Aspect 17. A system as substantially described herein.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method for constructing an HVAC system for a structure having distinct thermal zones, comprising the steps of:
   defining, by a device comprising a processor, the structure;
   defining, by the device, an HVAC topology included in the structure;
   identifying, by the device, common elements of the HVAC topology associated with a distinct thermal zone;
   defining, by the device, a zone group comprising distinct zones sharing a common element;
   modifying, by the device, membership of the zone group in response to a determination that a first zone of the zone group no longer shares the common element with a second zone of the zone group; and
   determining, by the device, a different common element shared by the first zone.

2. The method in accordance with claim 1, wherein the step of defining an HVAC topology included in the structure comprises defining one or more HVAC components included in the structure.

3. The method in accordance with claim 1, wherein the step of defining an HVAC topology included in the structure comprises defining an interconnection between one or more HVAC components included in the structure.

4. The method in accordance with claim 1, wherein the step of modifying membership of the zone group comprises removing from the zone group the first zone that no longer shares the common element with the second zone of the zone group; and
   adding the first zone to a different zone group comprising distinct zones sharing the different common element.

5. The method in accordance with claim 1, wherein defining an HVAC topology included in the structure comprises:
   providing a set of pre-defined characteristics of an HVAC component, wherein the pre-defined characteristics include a configuration rule and a simulation rule;
   inserting a representation of a distinct thermal zone into a zone tree;
   joining the HVAC component to at least one other HVAC component in the representation of the distinct thermal zone based upon the pre-defined characteristics of the respective HVAC components being joined.

6. The method in accordance with claim 5, wherein the set of pre-defined characteristics of an HVAC component are expressed in an extensible markup language.

7. The method in accordance with claim 5, wherein the inserting the representation of the distinct thermal zone into the zone tree includes storing the configuration rule and the simulation rule in third normal form.

8. A method for constructing an HVAC system model of a structure having distinct thermal zones, comprising the steps of:
   defining, by a device comprising a processor, the structure;
   defining, by the device, a plurality of HVAC components included in the structure;
   defining, by the device, interconnections between two or more of the plurality of HVAC components included in the structure;
   identifying, by the device, a further HVAC component to be inserted into an interconnection of the structure; and
   identifying, by the device, a candidate interconnection into which the further HVAC component may be inserted.

9. The method in accordance with claim 8, further comprising inserting, by the device, the further HVAC component into the candidate interconnection.

10. The method in accordance with claim 8, wherein the candidate interconnection is selected from the group consisting of a refrigerant circuit, an air duct, and a control circuit.

11. A method, comprising:
   displaying a plurality of HVAC system configurations in a viewer executing on an electronic device having a graphic display;
   receiving, at the electronic device, a user selection of HVAC system configuration;
   displaying the selected HVAC system configuration in the viewer;
   displaying a plurality of HVAC components in the viewer;
   receiving, at the electronic device, a user selection of a HVAC component;
   applying a rules-based engine to determine the possible locations within the HVAC system configuration at which the selected HVAC component may be placed; and displaying the possible locations the selected HVAC component may be placed on the HVAC system configuration in the viewer.

12. The method in accordance with claim 11, further comprising placing the selected HVAC component at one of the determined possible locations.

13. A computer-implemented method for configuring a heating, ventilation, and air conditioning (HVAC) system of a building, comprising:
receiving, by a processor, a floor plan of the building;
receiving, by the processor, an HVAC system configuration selected from among a set of template HVAC configurations;
receiving, by the processor, an HVAC component selected from among a set of template HVAC components;
determining, by the processor, a candidate position for the HVAC component within the HVAC system configuration; and
displaying, on a visual display in communication with the processor; the candidate position for the HVAC component on a schematic diagram of the HVAC system configuration.

14. A computer-implemented method for configuring a heating, ventilation, and air conditioning (HVAC) system of a building, comprising:
receiving, by a processor, a floor plan of the building, wherein the floor plan includes a mapping of an HVAC system configuration to a first HVAC zone group;
receiving, by the processor, a change to the HVAC system configuration associated with a first HVAC zone of the first HVAC zone group;
determining, by the processor, whether a second HVAC zone group is mapped to a system configuration having the same properties as the changed HVAC configuration of the first zone;
responding to a determining that a second HVAC zone group is not mapped to a system configuration having the same properties as the changed HVAC configuration of the first zone by removing the first zone from the first HVAC zone group, creating a new HVAC zone group, and adding the first zone to the new HVAC zone group; and
displaying, on a visual display in communication with the processor; the zone of the new zone group using a different visual representation from that of the first zone group.

15. The computer-implemented method in accordance with claim 14, further comprising:
responding to a determining that a second HVAC zone group is mapped to a system configuration having the same properties as the changed HVAC configuration of the first zone by removing the first zone from the first HVAC zone group and adding the first zone to the second HVAC zone group.

16. The computer-implemented method in accordance with claim 14, further comprising automatically assigning a new name to the new HVAC zone group.

17. The computer-implemented method in accordance with claim 14, wherein a different visual representation includes a different color, a different hatching, and/or a different background image.

* * * * *